May 3, 1927.  1,627,408
F. ROBERTS
COMB FOR HAIR CUTTING
Filed June 26, 1925
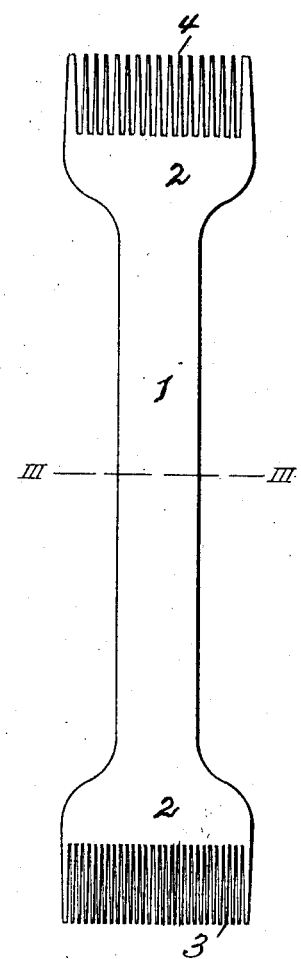
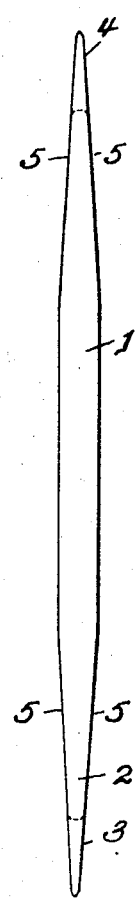
Fred Roberts
Inventor,
By Daniel E. Lofgren
Attorney.

Patented May 3, 1927.

1,627,408

UNITED STATES PATENT OFFICE.

FRED ROBERTS, OF PORTLAND, OREGON.

COMB FOR HAIR CUTTING.

Application filed June 26, 1925. Serial No. 39,831.

This invention relates to an improvement in combs, particularly designed for use by barbers and others who have frequent need for combs of different degrees of fineness.

In barbers use, particularly in cutting hair, it is frequently necessary to use combs of different fineness, and while ordinarily a comb having differently spaced teeth may be employed, the usual custom is to exchange the comb being used for one of finer or coarser teeth, as required. This necessitates a frequent change of combs by the barber, requiring not only two combs but entailing a loss of time.

The present invention is designed to provide in a single unitary structure two combs of different degrees of fineness and of sufficient length for barbers use, the combs being connected by a handle portion of convenient size, so that either comb may be readily positioned for use by a simple reversal on the part of the barber.

The invention is illustrated in the accompanying drawings, in which:

Fig. I is a plan view of the improved comb.

Fig. II is an edge view of the same.

Fig. III is a section on line III—III of Fig. I.

The improved comb comprises a unitary structure preferably of hard rubber or other appropriate material, including a central handle portion 1, of uniform sectional area throughout its length and of a size to be conveniently grasped in the hand, the width being preferably greater than the thickness to prevent casual turning of the device when in use. At the respective ends, the handle portion is laterally enlarged at 2, and terminally formed at the ends of the enlargements to provide comb teeth. These comb teeth are of different degrees of fineness, as for example, the teeth shown at 3 being finer than the teeth shown at 4. The sides of the handle in the plane of the teeth taper from a portion inwardly of the enlargement to the rounded terminals of the comb teeth, these tapered faces 5 providing for the convenient introduction of the implement into the hair of the head without obstruction, and also insuring that the comb teeth proper shall be tapered on all sides, as is usual.

In the use of the implement, the barber, with the teeth at one end in use, and desiring to use the teeth at the other end, will simply reverse the implement in his hand, without loss of time and without the necessity of selecting another comb. The barber has thus at his selection combs of different degrees of fineness at all times conveniently available, and either of which may be used by a simple reversal of the position of the implement.

The comb teeth proper are preferably of a comparatively restricted length, as in the use for which the invention is primarily designed, a short length of teeth only, that is, a short longitudinal length of comb is in use at one time.

What is claimed as new is:

A barber's implement comprising a handle of uniform rectangular dimensions throughout its middle portion, each end having its width increased uniformly beyond the handle and its depth uniformly tapered to form operative portions.

FRED ROBERTS.